United States Patent [19]

Demarest

[11] 4,332,475

[45] Jun. 1, 1982

[54] EDGE TIMING IN AN OPTICAL MEASURING APPARATUS

[75] Inventor: Frank C. Demarest, Killingworth, Conn.

[73] Assignee: Zygo Corporation, Middlefield, Conn.

[21] Appl. No.: 156,050

[22] Filed: Jun. 3, 1980

[51] Int. Cl.³ ............................................. G01B 11/10
[52] U.S. Cl. .................... 356/386; 356/387; 250/563
[58] Field of Search ................ 356/384, 385, 386; 324/78 D, 83 D; 250/560, 563, 571

[56] References Cited

U.S. PATENT DOCUMENTS

| | | | |
|---|---|---|---|
| 3,731,196 | 5/1973 | Young | 324/78 D |
| 3,905,705 | 9/1975 | Petrohilos | 356/386 |
| 3,907,439 | 9/1975 | Zanoni | 250/560 |
| 4,097,158 | 6/1978 | Dehait | 356/386 |
| 4,294,545 | 10/1981 | Stutz | 356/386 |

OTHER PUBLICATIONS

McNeish et al. "Counter Brings Best Resolution to One-Shots, does Math and Reads Volts" *Electronic Design* 9, 26 Apr. 1980, pp. 137–140.

Chu et al. "Universal Counter Resolves Picoseconds in Time Interval Measurements" *Hewlett-Packard Journal*, Aug. 1978, pp. 2–11.

*Primary Examiner*—R. A. Rosenberger
*Attorney, Agent, or Firm*—Milton Zucker

[57] ABSTRACT

An electro-optical sensor is described which provides a high resolution measurement of the location of the edge of an object. By passing the electrical pulse produced by an edge sensor into a multiply tapped delay line the location of the edge of an object can be measured with high resolution.

2 Claims, 6 Drawing Figures

EDGE TIMING IN AN OPTICAL MEASURING APPARATUS

BACKGROUND OF THE INVENTION

1. Field of the Invention

The present invention relates to an apparatus for the high resolution measurement of the location of the edge of an opaque object. Specifically, the apparatus determines with high resolution the coincidence of the center of a laser beam and the edge of an opaque object when the laser beam and the edge of an opaque object are scanned past each other. More particularly, the invention relates to non-contacting electro-optical apparatus for this type of determination which is capable of rapidly measuring the dimensions of objects or holes in objects, measuring the location of edges of objects with very high resolution.

2. Prior Art

For the accurate measurement of the diameter, position, or thickness of soft, delicate, hot, or moving objects, non-contacting sensors must be used. Prior-art devices of this character include capacitive gauges, eddy-current gauges, air gauges, gamma and X-ray gauges, and optical sensors. Only the optical and nuclear gauges can work at distances greater than a small friction of an inch with sufficiently sensitivity. The nuclear gauges permit large working distances; however, they are extremely expensive and susceptible to systematic errors due to slight variations in the chemical composition of the object being measured.

Optical sensors have advantages because of the nature of light itself. The principle advantages are:

1. They do not require direct mechanical contact between the sensor and the object to be measured;
2. The distance from the sensor to the object to be measured can be large;
3. The response time is limited to that of the photodetector and its electronics;
4. Light variations are directly convertible to electrical signals; and
5. The measurements are independent of the chemical composition of the object.

Prior-art optical sensors employ various techniques to measure the location of the edge of an object and the time interval between the occurrence of two sensed edges. For example, Petrohilos U.S. Pat. No. 3,905,705 issued Sept. 16, 1975 discloses an optical measuring apparatus wherein the size of an object is measured by counting the number of constant frequency pulses which occur between two edge pulses. This traditional method of measuring time by counting cycles of a time base clock leads to the unavoidable quantization error of $\pm 1$ count. This error makes the technique unsuitable for very fine measurements; for example, for the measurement of optical fibers, a resolution of the order of 10 microinches is desired.

To reduce this error, there are three prior art techniques:

1. A very high frequency clock, e.g. 300–500 MHZ, can be used. While this approach is obvious and straight forward, it is costly in practice, due to the complications introduced by the high frequency.
2. A dual vernier interpolation using two high frequency clocks with slightly different frequencies can also be used, see Hewlett-Packard Journal, August 1978 (pages 2 to 11). This technique is quite complex and also costly.
3. An analog interpolation can be done by integrating and measuring a pulse of constant height, and width equal to the delay between the edge being measured and the time base. (See Electronic Design, Apr. 26, 1980, p. 137.) This technique is difficult to apply when a very short time interval must be measured.

OBJECT OF THE INVENTION

This invention aims to improve the resolution with which the coincidence of the center of a laser beam and the edge of an opaque object can be determined without recourse to the expensive techniques suggested by prior-art works. This new technique has broad utility in optical devices used to measure object diameters, sheet thickness, and object positions in a non-contacting manner.

Other objects of the invention will be apparent from the following description taken in connection with the accompanying drawings.

STATEMENT OF THE INVENTION

In accordance with the instant invention, I reduce the $\pm 1$ count error inherent in the electro-optical measuring devices while retaining the relatively trouble free low frequency clock by providing: (1) an electrical edge pulse produced by an edge sensor; (2) a fixed frequency time base; (3) means for generating a multiplicity of pulses from the edge pulse, each successive pulse being delayed by an additional identical fraction of the period of the time base; and (4) means for indicating which delayed pulse occurs immediately before the next transition of the time base. Most desirably, the means for delaying the edge pulse is a multiply tapped delay line where the delay for each tap is an identical fraction of the time base period.

Obviously, the number of fractions into which the delay line is divided governs the amount of improvement, a division into 10 corresponding to an increase of an order of magnitude. As many as 20 divisions may be feasible, the main limitation being the accuracy of the delay line which is typically $\pm 3\%$. The preferred implementation may have 8 or 10 divisions.

THE DRAWINGS

In the drawings,

FIG. 1 is a block diagram of a prior-art electro-optical measuring system.

FIG. 2 pictorially illustrates the timing of the circuitry of the prior-art system.

FIG. 3 is a block diagram illustrating an embodiment of the instant invention.

FIGS. 4, 5, and 6 pictorially illustrate the timing of the circuitry of the instant invention.

DETAILED DESCRIPTION OF THE INVENTION

While the technique has application for a wide range of radiation sources, the following description is taken by way of example with respect to an optical measuring system. The term "radiant energy" as used herein includes, but is not limited to, electromagnetic energy of all frequency ranges.

DESCRIPTION AND EXPLANATION OF FIGS. 1 AND 2

Figure 1:
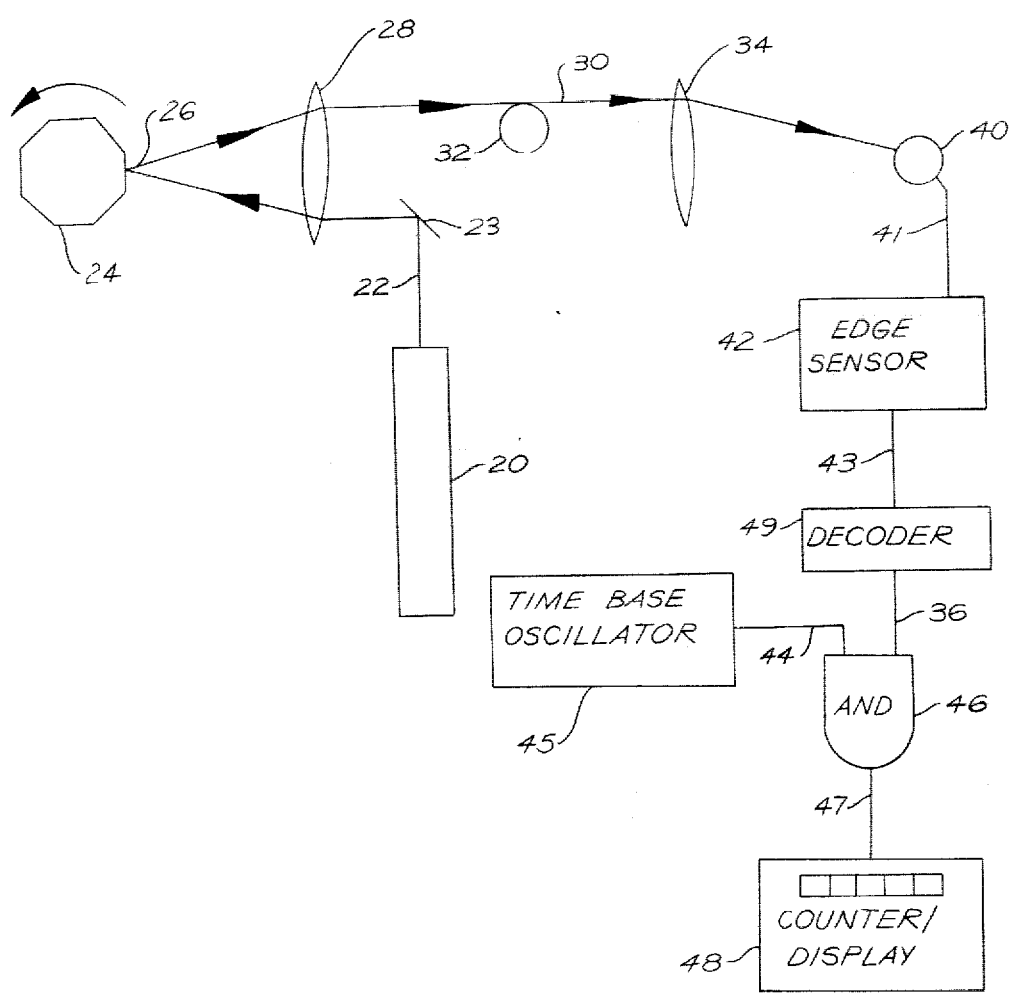

Referring to FIG. 1 of the drawings, a laser (20) produces a narrow beam of light (22) which falls on a mirror (23), which passes the beam through a lens (28), which in turn focuses the beam onto a uniformly rotating mirror (24), which may be multifaceted as shown, to produce a rotary-scanned beam (26). A lens (28) converts the rotary-scanned beam (26) into a linear-scanned beam (30), which passes by a test object (32), and then to a lens (34) which focuses the beam onto a photoelectric sensor (40). The diameter of the test object (32) is directly proportional to the length of time that the test object cuts off beam (30). Since beam (30) has a finite diameter of about 1 mm—that of the laser beam (22)—it is necessary to pinpoint the exact time at which a constant part of the beam passes the edges of the test object (32).

The light source (20) may be a tungsten bulb, xenon bulb, light-emitting diode or other source of energy, but is more preferably a gas laser. The photoelectric sensor (40) may be a vacuum photodiode, photomultiplier, silicon photocell, or a PIN photodiode.

Figure 2:
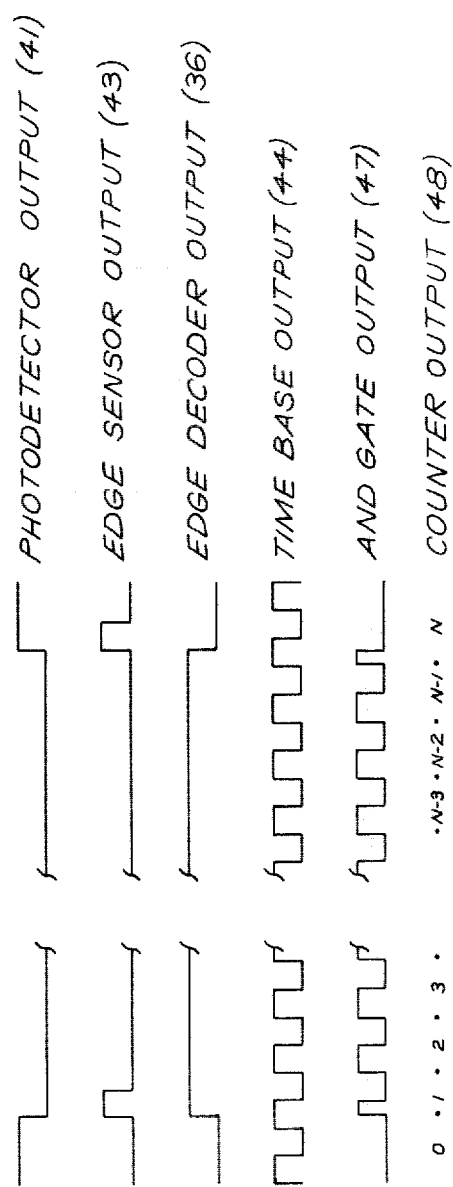

Referring to FIG. 1 and FIG. 2 of the drawings, FIG. 2 shows typical waveforms associated with the circuitry.

The output (41) of the photodetector (40) is fed to edge sensor circuitry (42) to produce a pulse (43), whose leading or trailing edge signifies the coincidence of the center of the laser beam (30) and an edge of the opaque object (32).

The accurate determination of the precise point at which the center of the laser beam passes the edge is obtained preferably with an edge sensor which defines the edge as the point at which the first derivative of the output of the photosensor amplifier is above a fixed value, and the second derivative of the output of the photosensor amplifier passes through zero. See Zanoni U.S. Pat. No. 3,907,439 issued Sept. 23, 1975.

The output (43) of the edge sensor (42) is fed to the decoder (49). The decoder (49) produces a signal (36) which remains as either logic "1" or "0" for the interval between two edge pulses on signal (43). The output signal (36) of the decoder (49) is fed to an AND gate (46). The output (44) of the time base oscillator (45) is fed to the AND gate (46). The output (47) of the AND gate (46) is fed to the combined display and counter device (48). The display and counter device (48) includes solid state binary elements which count the pulses received by gate (46) between the occurrence of the two edge pulses (43). The number of pulses counted are scaled (calibrated) to correspond to the distance of lateral movement of the parallel scanning laser beam (30).

The dimensional measurement principle of the apparatus is based upon the constant, or known, scan speed of beam (30) and the measurement of the time interval between the occurrence of the two edge pulses produced by an opaque object (32). Devices (45), (46) and (48) in FIG. 1 serve the purpose of measuring the time interval between the occurrence of two edge pulses. This traditional method leads to unavoidable quantization error of ±1 count of the time base oscillator. For many applications, this source of error is unacceptably large for easily usable oscillator frequencies.

DESCRIPTION AND EXPLANATION OF FIG. 3

Figure 3:
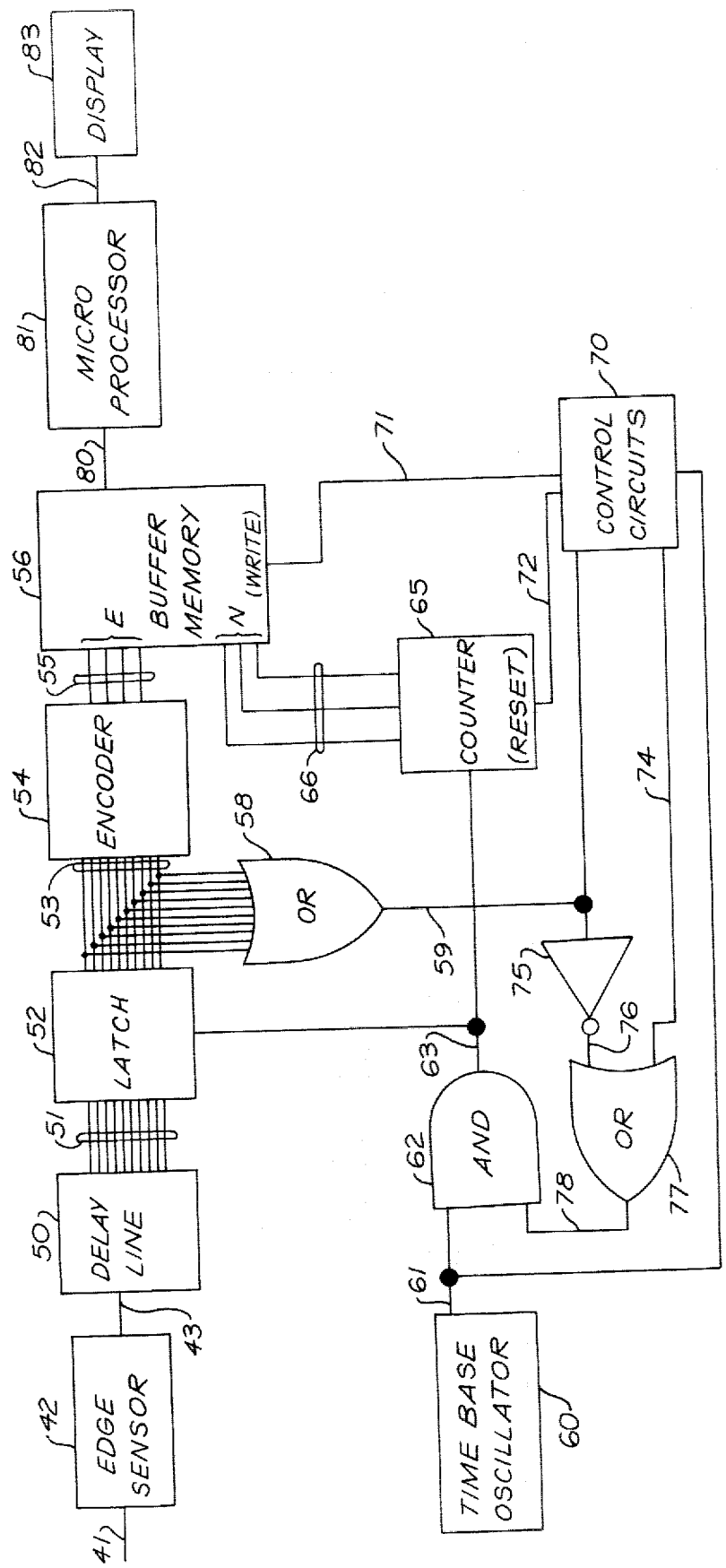

FIG. 3 is a block diagram illustrating an embodiment of the instant invention.

In FIG. 3, the output (43) of the edge sensor (42) is fed to a multiply tapped delay line (50). The outputs (51) of the delay line (50) are fed into the latch (52). Latch (52) is typically an edge triggered, octal, "D" Flip-Flop. The outputs (53) of latch (52) are fed into the priority encoder (54) and into the OR gate (58). The output (61) of the time base oscillator (60) is fed into the AND gate (62) and into the control circuits (70). The control circuits (70) has three outputs. The first signal (74), is fed into OR gate (77). The second, signal (72) is a reset for counter (65). The third, signal (71) is a write signal for buffer memory (56). The output (59) of OR gate (58) is inverted by inverter (75) to generate a signal (76) which is fed into the OR gate (77). The output (78) of OR gate (77) is fed into the AND gate (62) which generates signal (63) which is fed into latch (52) and into counter (65). The outputs (55) of encoder (54) and the outputs (66) of counter (65) are fed into the buffer memory (56). The output (80) of buffer memory (56) is fed into a microprocessor device (81). The microprocessor device (81) performs the calculations required by Equation 1 below and generates a suitable digital output (82) which is fed into the display device (83) where the appropriate dimension is read.

Figure 4:
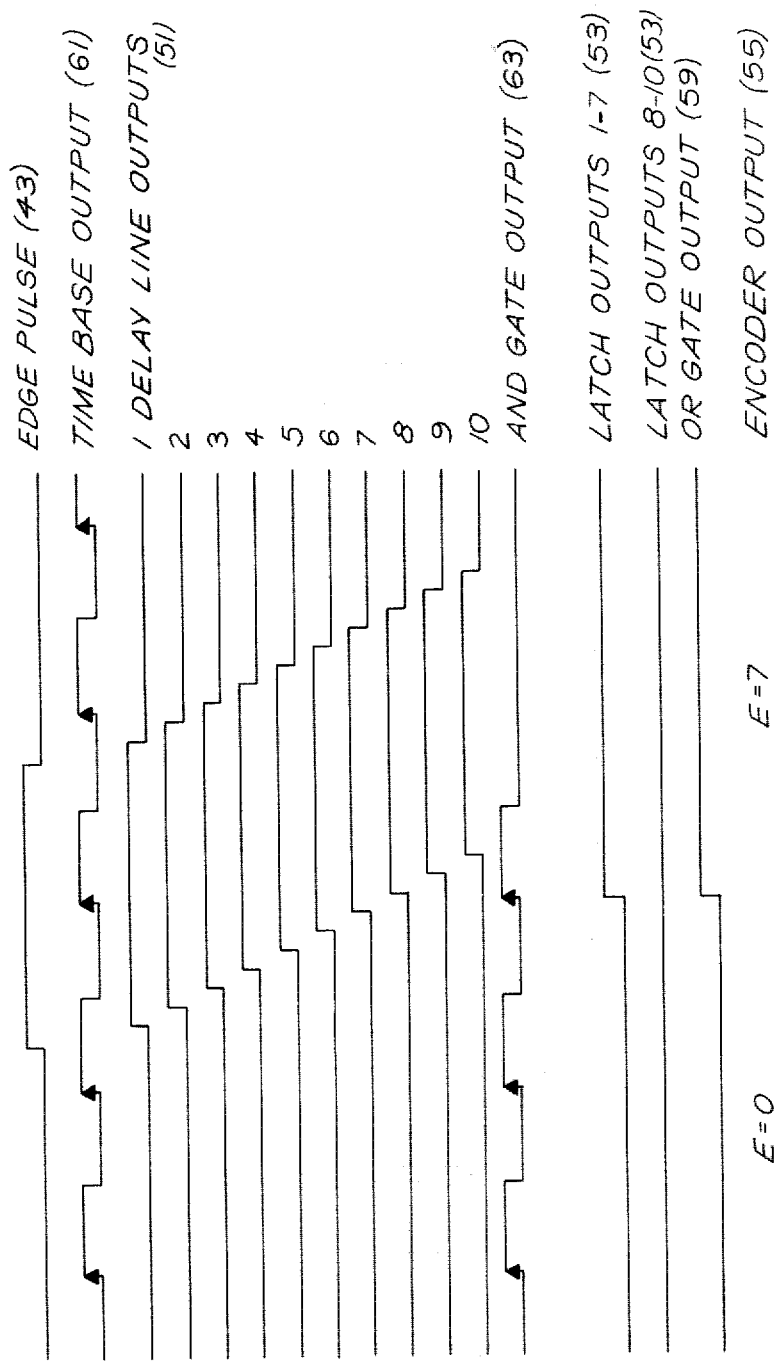
Figure 5:
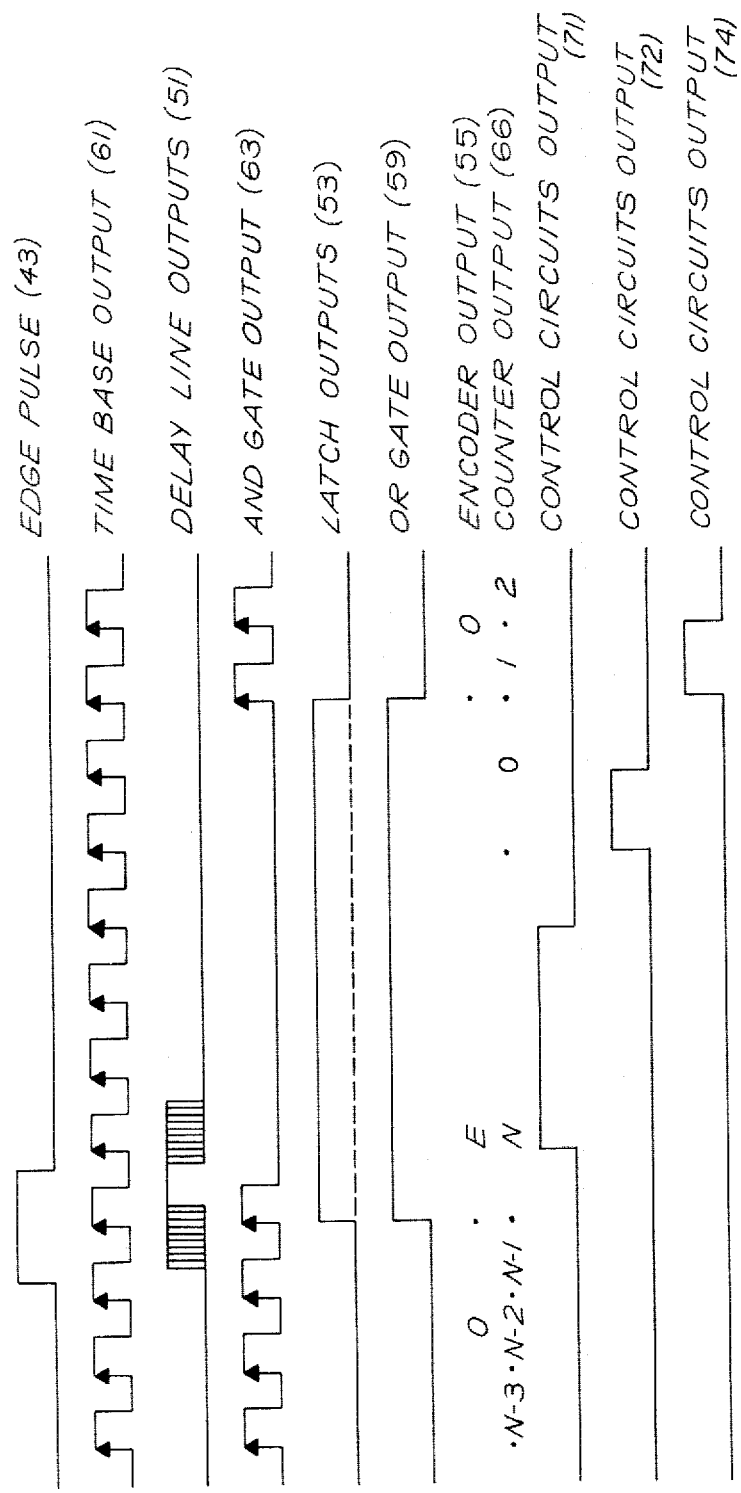

The operation of the circuitry shown in FIG. 3 will now be explained while referring to typical timing diagram shown in FIGS. 4, 5, and 6. In these timing diagrams, the time delays inherent in the logic devices are not shown.

Between edge pulses (43), OR gate (58) output (59) is inactive, inverter (75) and OR gate (77) provide an output (78) to AND gate (62) enabling the time base output (61) to pass to latch (52) and counter (65). On the rising edge of the time base oscillator output (61), the delay line (50) outputs (51) are latched by latch (52) and the counter (65) counts by 1. When the edge pulse (43) occurs, it travels along the delay line (50). After the rising edge of the next time base oscillator pulse, the latch (52) outputs (53) represent the elapsed time between the edge pulse and the time base oscillator pulse. An OR gate (58) detects an output (53) from the latch (52) representing the edge pulse (43) and inhibits the time base oscillator to the latch (52) and counter via the inverter (75), OR gate (77) and the AND gate (62). The contents of the latch (52) are encoded by the priority encoder (54) into a binary value to make processing easier. Referring now to FIG. 3 and FIG. 5, the control circuits (70) provide signal (71) to store the number (66) from the counter (65) and the output (55) from the encoder (54) for further processing. Then the control circuitry (70) resets the counter (65) with output (72) and enables the time base oscillator (60) to the latch (52) and counter (65) with output (74) through OR gate (77) and AND gate (62).

During the time the control circuits (70) are storing the measurement and resetting the counter, the counter is not counting. The control circuits may be designed to operate synchronously with the time base, so the number of missed counts is exactly known.

When the edge pulse (43) has traveled entirely out of the delay line (50), and the delay line outputs (51) are latched by latch (52), latch outputs (53) and the output (59) of the OR gate (58) become inactive. Then the output (76) of inverter (75) to OR gate (77) enables the time base oscillator to the latch (52) and counter (65) and the control circuits (70) removes its output (74) to the OR gate (77).

Figure 6:
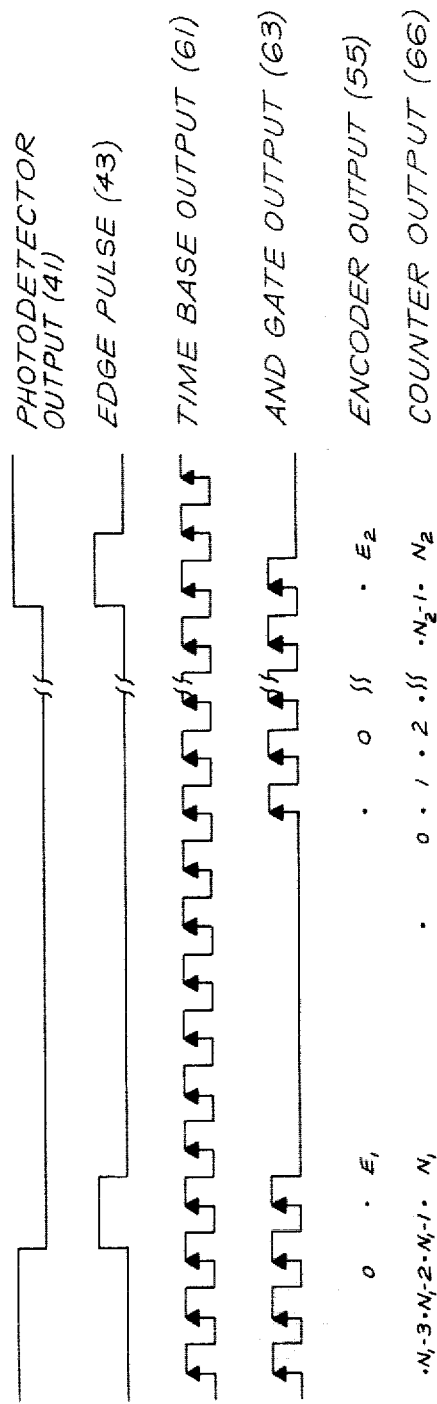

Referring now to FIG. 3 and FIG. 6, for example, suppose: (1) the time base oscillator (60) output (61) frequency is 20 MHz (period=50 ns); (2) the delay line (50) has 10 taps spaced 5 ns apart; (3) the control circuits (70) let exactly 6 time base oscillation pulses occur during the time when the outputs (55) and (56) are stored in buffer memory (56) and the counter (65) is reset; (4) the value in the counter when edge pulse 2 occurs is $N_2$, and; (5) the value from the encoder (54) is $E_1$ at edge pulse 1 and $E_2$ at edge pulse 2, then the time elapsed between edge pulse 1 and edge pulse 2 is:

$$T = 50(6 + N_2) + 5(E_1 - E_2) \text{ in nanoseconds} \quad \text{(Equation 1)}$$

As with any digital measurement, there is a $\pm 1$ count quantization error. However, with the instant invention this uncertainty is reduced by a factor equal to the number of taps in the delay line for a given time base frequency. With 10 taps, the quantization error is reduced by a factor of 10 for individual measurements, i.e. without averaging.

While a preferred embodiment of the invention has been disclosed, obviously modifications can be made therein, without departing from the scope of the invention as defined in the following claims.

I claim:

1. In a device for measuring the size of an object by scanning a beam of radiant energy past the object into a photosensor, and the time between the passage of the beam from one edge of the object to the next is measured by the number of pulses from a fixed period time base elapsing during said passage, the improvement which comprises providing: (1) an electrical edge pulse produced by an edge sensor; (2) a fixed frequency time base; (3) means for generating a multiplicity of pulses from the edge pulse, each successive pulse being delayed by an additional identical fraction of the period of the time base; and (4) means for indicating which delayed pulse occurs immediately before the next transition of the time base.

2. The device of claim 1, in which element 3 is provided by a multiply tapped delay line where the delay for each tap is an identical fraction of the time base period.

* * * * *